US012068107B2

(12) United States Patent
Ushikubo

(10) Patent No.: US 12,068,107 B2
(45) Date of Patent: Aug. 20, 2024

(54) SOLENOID

(71) Applicant: TDS CO. LTD, Okaya (JP)

(72) Inventor: Takehiko Ushikubo, Okaya (JP)

(73) Assignee: TDS CO. LTD, Okaya (JP)

( * ) Notice: Subject to any disclaimer, the term of this patent is extended or adjusted under 35 U.S.C. 154(b) by 407 days.

(21) Appl. No.: 17/435,897

(22) PCT Filed: Mar. 13, 2019

(86) PCT No.: PCT/JP2019/010385
§ 371 (c)(1),
(2) Date: Sep. 2, 2021

(87) PCT Pub. No.: WO2020/183675
PCT Pub. Date: Sep. 17, 2020

(65) Prior Publication Data
US 2022/0181060 A1 Jun. 9, 2022

(51) Int. Cl.
*H01F 7/16* (2006.01)
*H01F 7/08* (2006.01)
*H01F 7/121* (2006.01)
*E05B 47/00* (2006.01)
*H01F 7/126* (2006.01)

(52) U.S. Cl.
CPC ............... *H01F 7/16* (2013.01); *H01F 7/081* (2013.01); *H01F 7/121* (2013.01); *E05B 47/0004* (2013.01); *H01F 2007/083* (2013.01); *H01F 7/126* (2013.01)

(58) Field of Classification Search
CPC . H01F 7/16; H01F 7/081; H01F 7/121; H01F 7/126; H01F 2007/083; H01F 7/124; H01F 7/1607; H01F 2007/062; E05B 47/0004
USPC .......................................................... 335/281
See application file for complete search history.

(56) References Cited

U.S. PATENT DOCUMENTS 3,022,450 A * 2/1962 Chase, Jr. ............. H01F 7/1615 335/229
3,634,735 A * 1/1972 Komatsu ............... H01F 7/1646 361/194
4,518,939 A * 5/1985 Read ..................... H01F 7/1607 335/262
5,821,840 A * 10/1998 Ricker .................... H01F 7/081 335/250
6,265,956 B1 * 7/2001 Cascolan .............. H01F 7/1615 335/278
2006/0181380 A1 * 8/2006 Nakamura ........... H01H 50/646 335/132

(Continued)

FOREIGN PATENT DOCUMENTS

JP 52-50356 Y2 11/1977
JP 2002-289422 A 10/2002

(Continued)

*Primary Examiner* — Shawki S Ismail
*Assistant Examiner* — Lisa N Homza
(74) *Attorney, Agent, or Firm* — Birch, Stewart, Kolasch & Birch, LLP

(57) ABSTRACT

A solenoid contains a yoke, a bobbin having an electromagnetic coil disposed inside the yoke, and an iron core disposed inside the bobbin. In the solenoid, a connector part incorporating a prescribed number of terminal metal fittings is provided on one end portion of the bobbin.

12 Claims, 9 Drawing Sheets

(56) References Cited

U.S. PATENT DOCUMENTS

| | | | | |
|---|---|---|---|---|
| 2013/0328649 | A1* | 12/2013 | Robertson | H01F 7/08 335/234 |
| 2019/0096557 | A1* | 3/2019 | Church | H01F 7/1646 |
| 2020/0027636 | A1* | 1/2020 | Kobayashi | F16K 31/06 |
| 2021/0012938 | A1* | 1/2021 | Dams | H01F 41/061 |
| 2022/0189671 | A1* | 6/2022 | Ushikubo | H01F 7/081 |

FOREIGN PATENT DOCUMENTS

| | | | |
|---|---|---|---|
| JP | 2012-186237 | A | 9/2012 |
| JP | 2013-206911 | A | 10/2013 |
| JP | 2013-222806 | A | 10/2013 |
| WO | WO 2018/173189 | A1 | 9/2018 |

* cited by examiner

[FIG. 1]
(a)
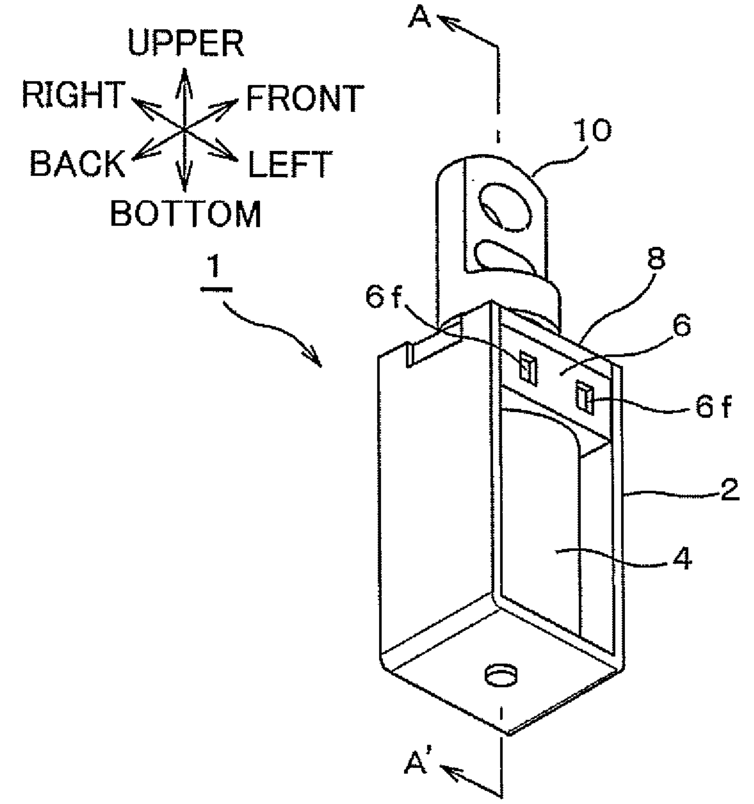
(b)
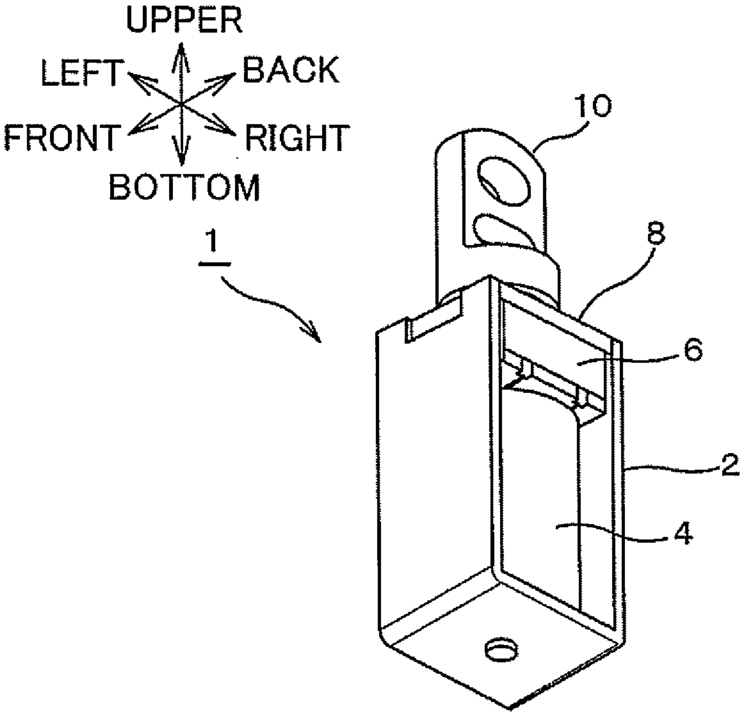

[FIG. 2]
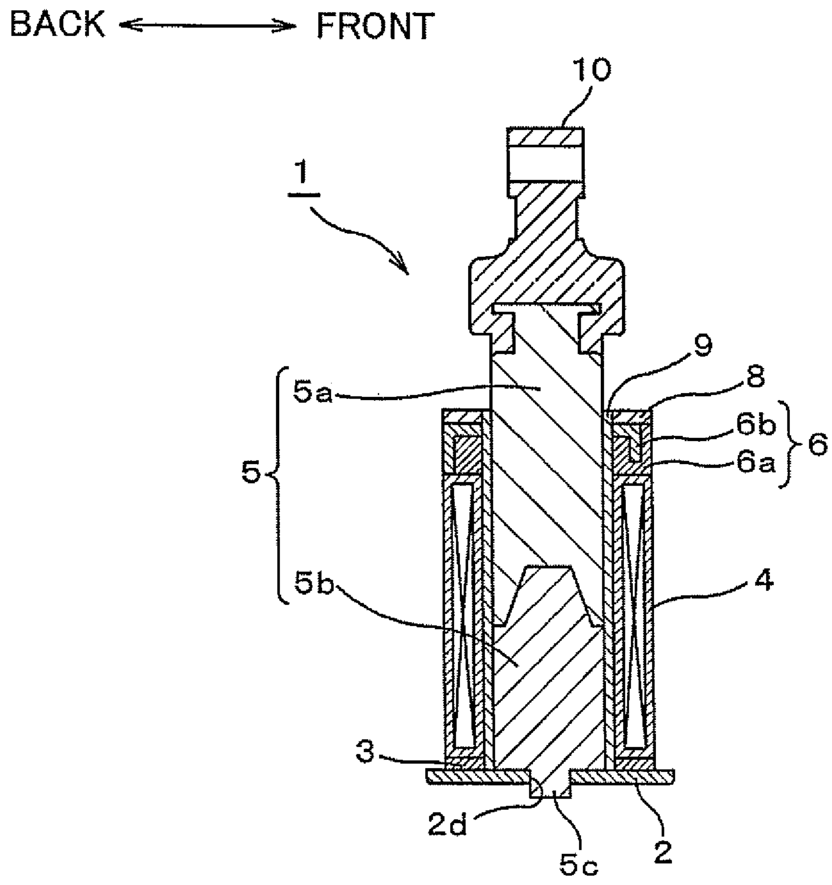

[FIG. 3]
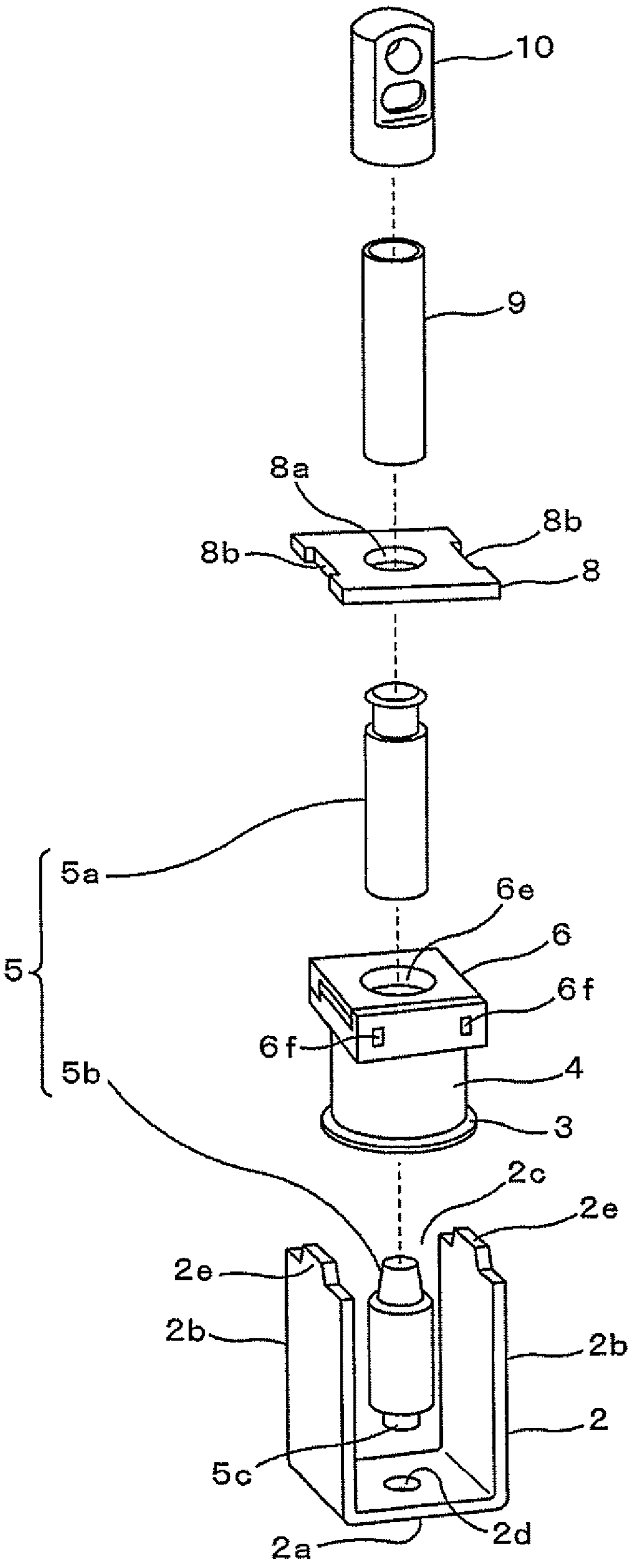

[FIG. 4]
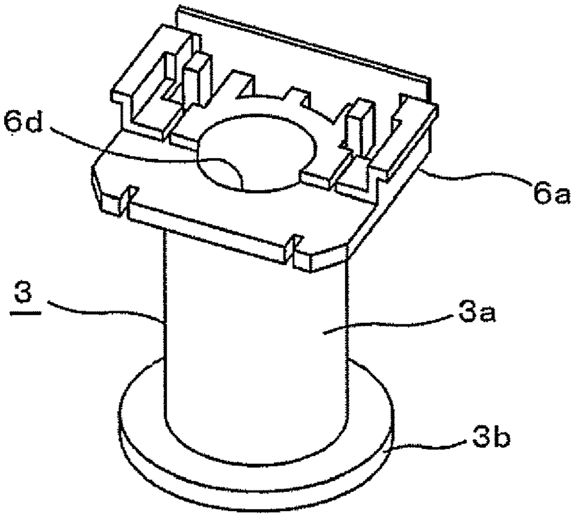
[FIG. 5]
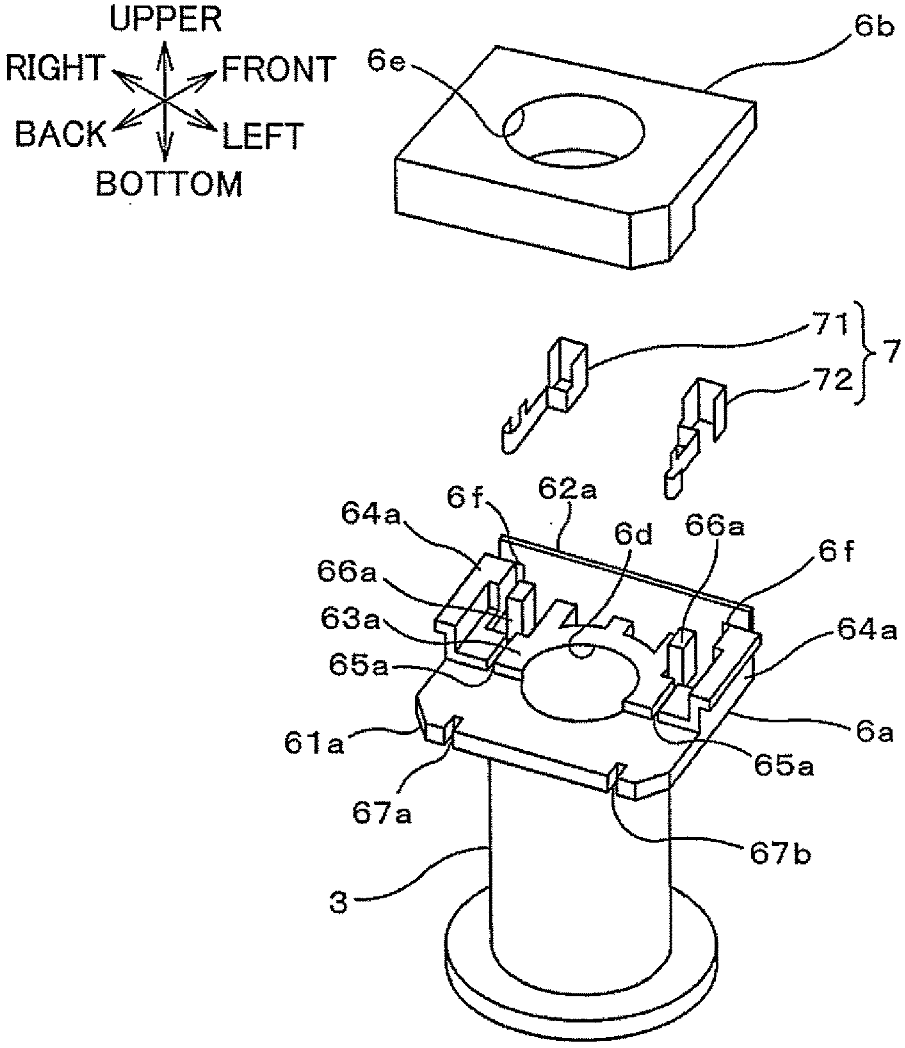

[FIG. 6]
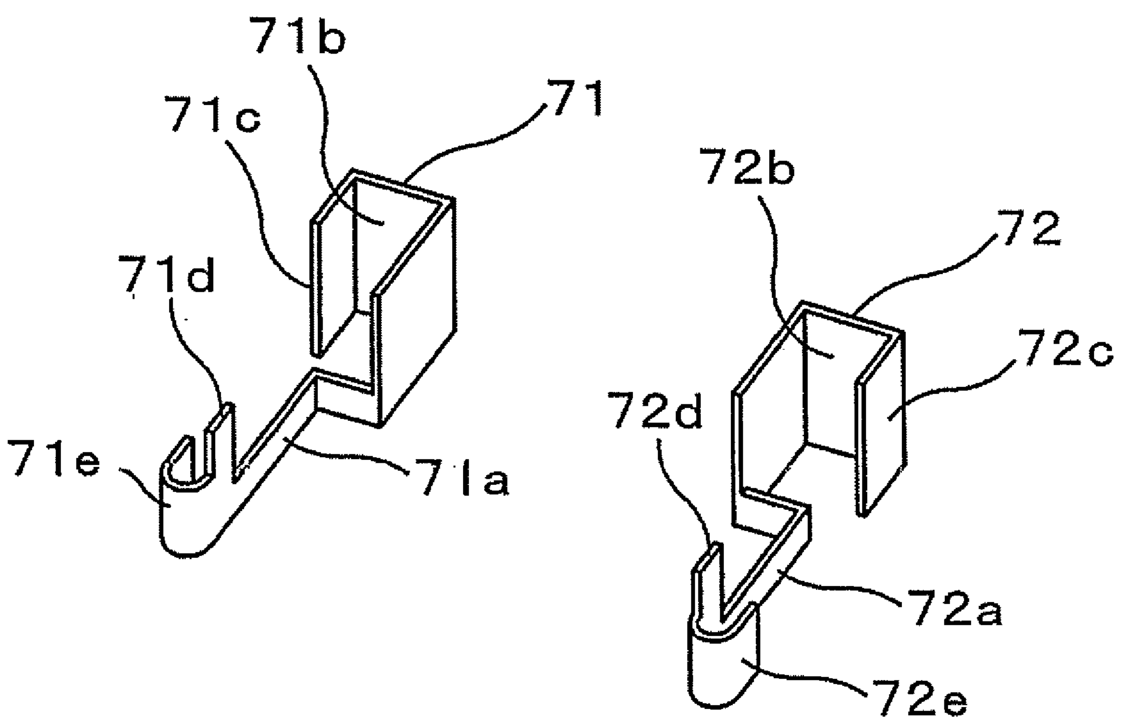
[FIG. 7]
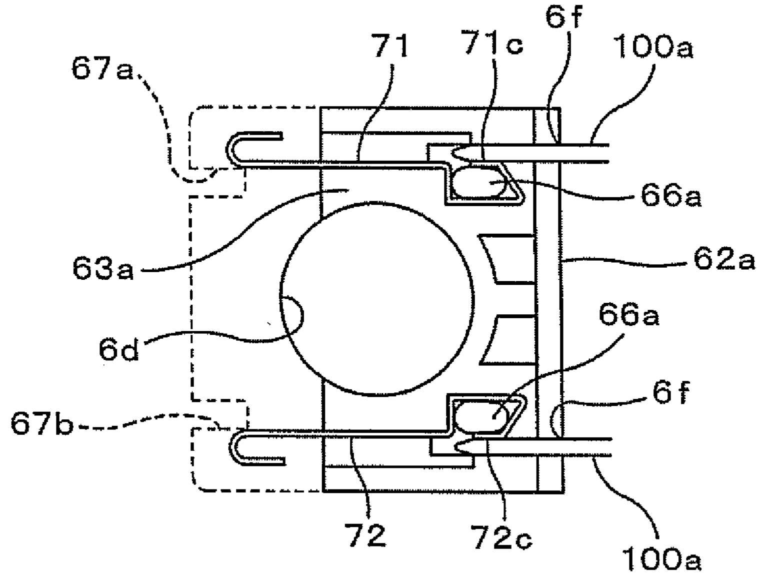

[FIG. 8]
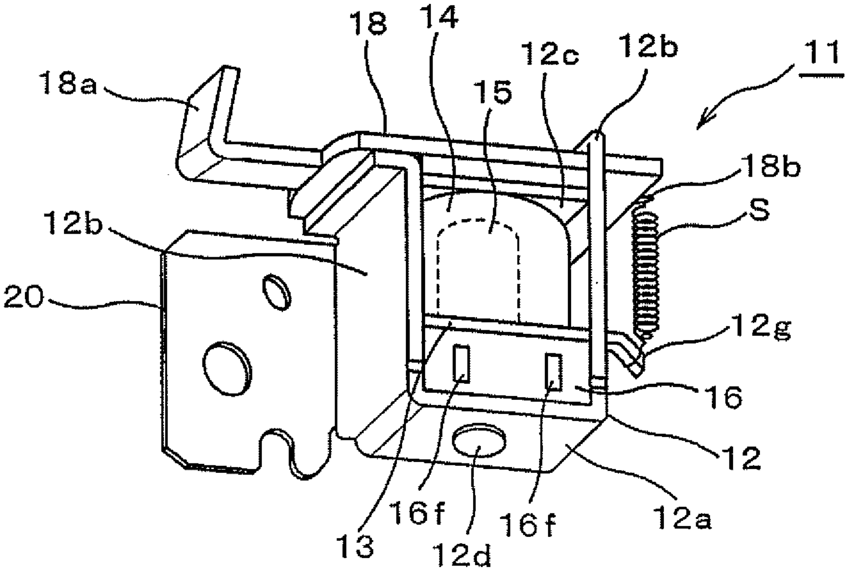
[FIG. 9]
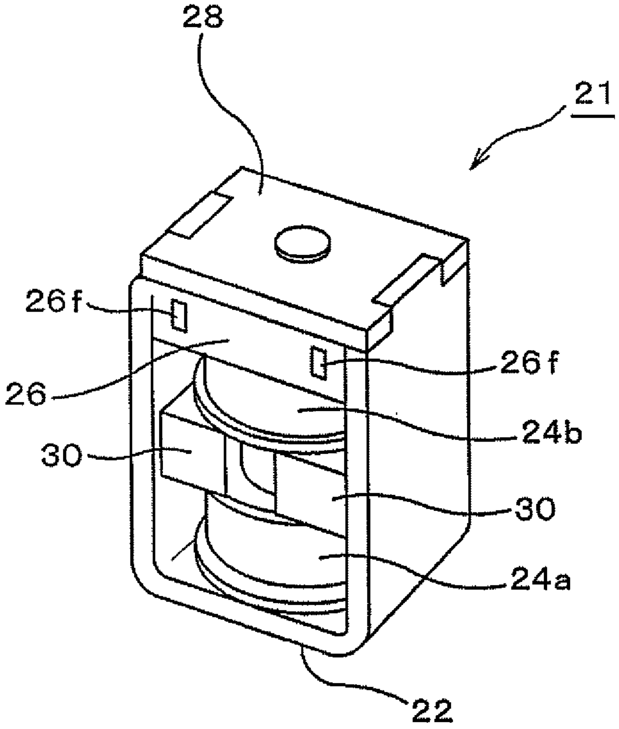

[FIG. 10]
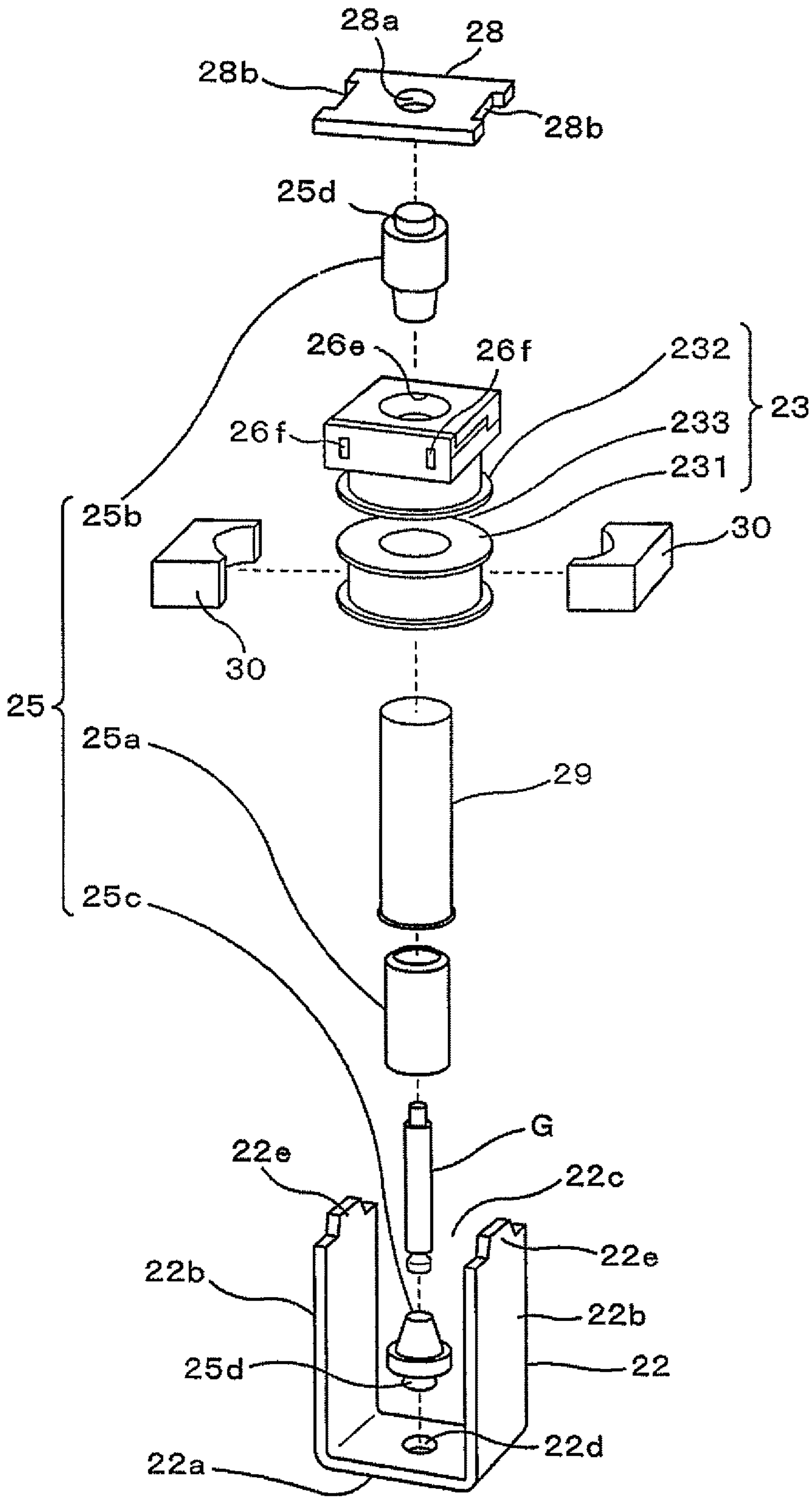

[FIG. 11]
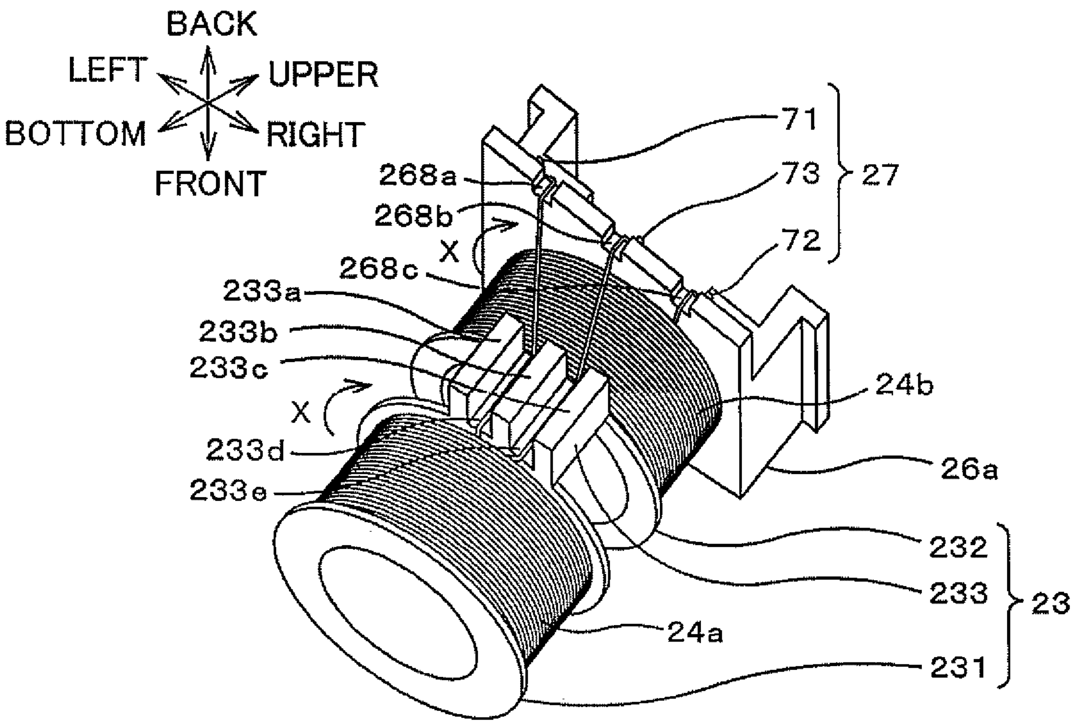

[FIG. 12]
（a）
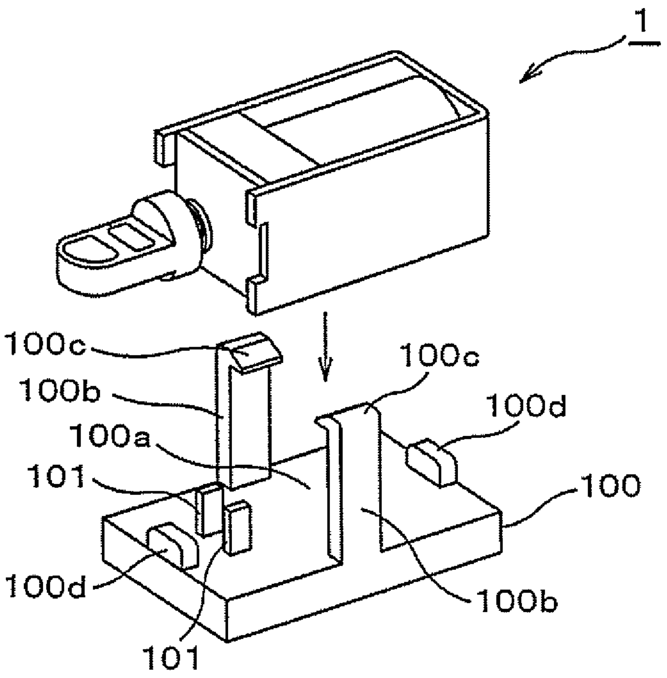
（a）
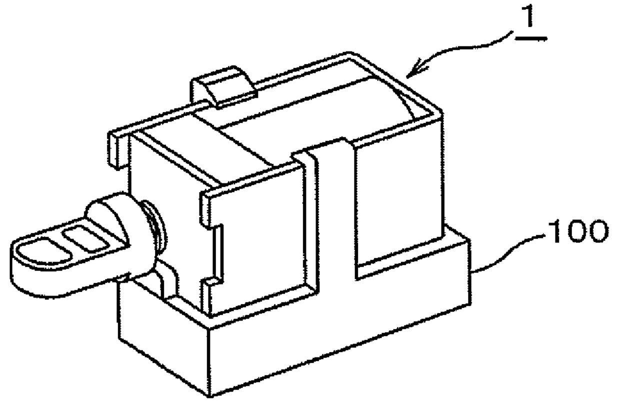

SOLENOID

TECHNICAL FIELD

The present invention relates to a solenoid, which is used in various apparatus such as a key for money box of register, an unlock mechanism of shift lever for automobile.

More specifically, the present invention relates to a solenoid, which is inexpensive and small and can be easily attached.

BACKGROUND ART

An existing solenoid is generally configured by a section channel shaped yoke body having upright side walls directed upward in the opposed side edges of the bottom, a stopper receiver fixed on the bottom, a plunger attached to the plunger (iron core), and a yoke lid for closing the opening portion of the yoke.

Conventional solenoid is configured so that a magnetic field is generated around the coil when the coil is energized through the counterpart connector portion (female terminal) inserted to the connector part (male terminal).

An example of such a solenoid is disclosed in Patent Document 1.

In Japanese Patent Kokai Application Publication No. JP2013-222806A (Patent Document 1), a flapper-type solenoid is proposed that, includes a bobbin having an electromagnetic coil that is disposed in a yoke, a magnetic core that is disposed in the bobbin, a flapper that is disposed above the yoke to be able to swing freely by a spring member engaged with the base end portion as the primary components, wherein at least the bobbin and the flapper that is disposed above the bobbin to be able to swing freely are formed from a plastic material, and the bobbin and the flapper are integrally connected through the spring member having an arc-shaped cross section.

This flapper-type solenoid is configured so that a magnetic field is generated around the coil when the coil is energized through lead wire(s).

PRIOR ART DOCUMENTS

Patent Documents

Patent Document 1: Japanese Patent Kokai Application Publication No. JP2013-222806A (Claims, Paragraph 0038, FIG. 1)

DISCLOSURE OF INVENTION

Technical Problem

Conventional flapper-type solenoids, such as the flapper-type solenoid disclosed in Patent Document 1, are configured so that the solenoid and the opposite party (various apparatus) are generally connected to each other by inserting male terminal(s) projecting from a connector part of the solenoid into female terminal(s) provided with a counterpart connector part, or through lead wire(s) so as to generate a magnetic field around a coil by energizing the coil.

Therefore, there is a problem in that a large space is required for providing the connector part or the lead wire(s) in the conventional solenoids.

Furthermore, in attaching the conventional solenoid to various apparatus, there is a problem in that the attaching work is complicated since two steps of a step of attaching the solenoid body to the apparatus and a step of connecting the solenoid and the apparatus through the connector part or the lead wire(s) are required.

In light of the foregoing, an object of the present invention is to provide a solenoid that is inexpensive and small and can be easily attached to various apparatus without a lead wire.

Solution to Problem

To achieve the above-described object, an aspect of the present invention described in claim 1 is a solenoid that contains a yoke, a bobbin having an electromagnetic coil disposed inside the yoke, and an iron core disposed inside the bobbin, wherein a connector part incorporating a prescribed number of terminal metal fittings is provided with one end portion of the bobbin.

According to an aspect of the present invention described in claim 2, in the solenoid described in claim 1, among the terminal metal fittings, the terminal, which is connected electrically to an external terminal provided with an apparatus having the solenoid, is configured by a female terminal.

According to an aspect of the present invention described in claim 3, in the solenoid described in claim 1 or 2, the connector part is provided on one axial end portion of the bobbin.

According to an aspect of the present invention described in claim 4, in the solenoid described in any one of claims 1 to 3, the yoke, which formed as a body having a U-shaped cross section, has a yoke lid for closing the upper opening portion of the yoke, the connector part is provided above the bobbin, and the iron core is configured by a fixed iron core having the lower end fixed to the bottom face of the yoke, and a movable iron core disposed above the fixed iron core to be able to oscillate freely.

According to an aspect of the present invention described in claim 5, in the solenoid described in claim 1, the yoke, which formed as a body having a U-shaped cross section, has a yoke lid for closing the upper opening portion of the yoke, the bobbin is configured as a coupling body in which two bobbins are axially coupled to each other, the iron core is configured by a first fixed iron core having the upper end fixed to the lower face of the yoke lid, a second fixed iron core having the lower end fixed to the bottom face of the yoke, and a movable iron core disposed to be able to oscillate freely between the first fixed iron core and the second fixed iron core, the connector part incorporates three terminal metal fittings disposed at prescribed spaces, and among the electromagnetic coils, one end of a winding forming a first electromagnetic coil is electrically connected to a first terminal metal fitting, the other end of the winding forming the first electromagnetic coil and one end of a winding forming a second electromagnetic coil are electrically connected to a second terminal metal fitting, and the other end of the winding forming the second electromagnetic coil is electrically connected to a third terminal metal fitting, respectively.

According to an aspect of the present invention described in claim 6, in the solenoid described in claim 5, both of the first and third terminal metal fittings are configured by a female terminal, and the coupling body has a pair of magnets arranged oppositely between the bobbins.

According to an aspect of the present invention described in claim 7, in the solenoid described in claim 1, the yoke has a flapper attached above the yoke to be able to swing freely, the iron core is configured by a fixed iron core having the lower end fixed to the bottom face of the yoke, and each end face of raised portions of the yoke is configured to be flush with the upper face of the iron core in a state where the iron core is attached.

According to an aspect of the present invention described in claim 8, in the solenoid described in claim 7, the connector part is provided below the bobbin, and the flapper is supported by a vertical flange formed on one raised portion, and is configured to be able to swing freely by attaching a spring member between the yoke and the flapper.

According to an aspect of the present invention described in claim 9, in the solenoid described in claim 8, the connector part is integrally provided on the lower end of the bobbin.

Advantageous Effects of Invention

The solenoid according to the present invention contains a yoke, a bobbin having an electromagnetic coil disposed inside the yoke, and an iron core disposed inside the bobbin.

In this solenoid, a connector part incorporating a prescribed number of terminal metal fittings is provided on one end portion of the bobbin.

Thus, in this solenoid, a relatively large space is not required for disposing lead wire(s) as in the prior art. Therefore, the solenoid is small, so that the solenoid can be inexpensively produced.

In the solenoid, among the terminal metal fittings, the terminal, which is connected electrically to an external terminal provided with an apparatus having the solenoid, may be configured by a female terminal.

By such a configuration, in this solenoid, a relatively large space is not required for providing a male terminal. In addition, when attaching the solenoid to the apparatus, the solenoid can be easily incorporated in the apparatus by inserting a male terminal, which is provided as a terminal on an external connector (external power source) provided with the apparatus, into the female terminal. Therefore, since it is not required to connect the solenoid and the apparatus through a connector part or lead wire(s), the assembly efficiency can be largely improved.

Furthermore, in the solenoid, the connector part may be provided on one axial end part of the bobbin.

Such a configuration allows the size of the solenoid to be reduced further.

In the solenoid, the bobbin may be configured as a coupling body in which two bobbins are axially coupled to each other. In this case, the iron core may be configured by a first fixed iron core having the upper end fixed to the lower face of the yoke lid, a second fixed iron core having the lower end fixed to the bottom face of the yoke, and a movable iron core disposed to be able to oscillate freely between the first fixed iron core and the second fixed iron core, and the connector part may have three terminal metal fittings which are provided at prescribed spaces, and among the electromagnetic coils, one end of a winding forming a first electromagnetic coil may be electrically connected to a first terminal metal fitting, the other end of the winding forming the first electromagnetic coil and one end of a winding forming a second electromagnetic coil may be electrically connected to a second terminal metal fitting, and the other end of the winding forming the second electromagnetic coil may be electrically connected to a third terminal metal fitting, respectively.

When one electromagnetic coil of two upper and lower electromagnetic coils, which are wound around the coupling body, is energized, the movable iron core is oscillated freely in the direction of the electromagnetic coil, which is energized, by such a configuration.

BRIEF DESCRIPTION OF DRAWINGS

FIG. 1 is a perspective view illustrating an example of a solenoid according to the present invention: (a) is a perspective view formed by viewing it from a front side; (b) is a perspective view formed by viewing it from a back side.

FIG. 2 is a sectional view in A-A' of the solenoid illustrated in FIG. 1.

FIG. 3 is an exploded perspective view formed by viewing the solenoid illustrated in FIG. 1 from a front side.

FIG. 4 is a perspective view formed by viewing a bobbin configuring the solenoid illustrated in FIG. 1 from a back side.

FIG. 5 is an approximately explanatory drawing explaining a connector part configuring the solenoid illustrated in FIG. 1.

FIG. 6 is an approximately explanatory drawing explaining an example of terminal metal fittings configuring the connector part illustrated in FIG. 5.

FIG. 7 is a transverse cross-sectional view illustrating the state where male terminals are inserted into the connector part configuring the solenoid illustrated in FIG. 1.

FIG. 8 is a perspective view formed by viewing another example of a solenoid according to the present invention from a front side.

FIG. 9 is a perspective view formed by viewing another example of a solenoid according to the present invention from a front side.

FIG. 10 is an exploded perspective view formed by viewing the solenoid illustrated in FIG. 9 from a front side.

FIG. 11 is an end face view of a bobbin configuring the solenoid illustrated in FIG. 9.

FIG. 12 is an approximately explanatory drawing explaining an example of a method for attaching the solenoid illustrated in FIG. 1 to various apparatus.

DESCRIPTION OF EMBODIMENTS

Hereinafter, the solenoid according to the present invention will be described in detail below with reference to the accompanying drawings.

Note that the present invention is not limited only to examples disclosed herein, and various modifications can be made thereto without changing the gist of the present invention.

As illustrated in FIGS. 1 and 2, a solenoid 1 according to the present invention contains a yoke 2, a bobbin 3 installed inside a central portion of the yoke 2, an electromagnetic coil 4 wound around the bobbin 3, a fixed iron core 5 disposed inside the bobbin 3, and a connector part 6 provided on one end portion of the bobbin 3.

In FIGS. 1 to 3, the yoke 2 is configured by a body having a U-shaped cross section, which is formed by a base portion 2*a* configuring a bottom face of the yoke 2 and a pair of raised portions 2*b* and 2*b* provided at both ends of the base portion 2$a$ to be parallel to each other. The upper opening portion 2$c$ of the yoke 2 is closed by a yoke lid 8.

Note that in FIGS. 1 to 3, the yoke 2 is formed in a U-shaped cross section; however, the shape of the yoke 2 may be appropriately selected according to the form or the like of the applied solenoid, and may be a shape other than the U-shaped cross section.

In FIG. 3, the yoke lid 8 is configured so that engaging portions 8$b$ and 8$b$, which are formed at both the longitudinal end portions of the yoke lid 8, engage with engaging pieces 2$e$ and 2$e$, which are formed protruding upward from the opposing regions at upper portions of the raised portions 2$b$ and 2$b$ of the yoke 2, respectively. The center portion of the yoke lid 8 has a passing hole 8$a$ formed in the vertical direction so as to correspond to through holes 6$d$ and 6$e$ formed at the center portion of the connector part 6.

The bobbin 3 is for winding a winding (conductor wire) which configures the electromagnetic coil 4, and contains, as a main body thereof, a tubular barrel part 3$a$ around which the winding is wound. The connector part 6, which incorporates a prescribed number of terminal metal fittings, is provided on one axial end part of the barrel part 3$a$.

Note that in the Examples, the bobbin 3 is formed from an insulating synthetic resin.

In FIG. 4, the bobbin 3 is configured by the cylindrical barrel part 3$a$ on which the winding is wound, a flat plate-shaped flange portion 3$b$ formed protruding outward in a radical direction from one axial end of the barrel part 3$a$, and a case body 6$a$ formed at the other end, which configures the connector part 6.

Such a configuration allows the size of the solenoid to be reduced further.

Note that in the Examples, the case body 6$a$ configuring the connector part 6 is configured to be integrally formed with the flange portion of the other end side of the bobbin 3; however, the case body 6$a$ and the flange portion may not necessarily be integrally formed, and they may be separately formed respectively.

Furthermore, in FIG. 4, the barrel part 3$a$ of the bobbin 3 is cylindrical. However, there is no particular limitations as a shape of the bobbin 3, and square tubular shape or the like may be selected as long as the bobbin 3 is configured so that a winding (conductor wire) can be wound.

In FIGS. 1 to 3, a through hole 3$c$ is formed to penetrate through a center portion of the barrel part 3$a$ along the axial direction, so that the iron core 5 can be arranged inside the through hole.

Note that in FIGS. 1 to 3, a pipe 9, which has an inner diameter approximately equal to the outer diameter of the iron core 5, is arranged between the bobbin 3 and the iron core 5, and a plunger (movable iron core) 5$a$, which configures the iron core 5, slides inside the pipe 9.

Thus, the through hole 3$c$ has an inner diameter approximately equal to the outer diameter of the pipe 9.

In the Examples, the bobbin is configured by one bobbin body. However, the bobbin may be configured as a bobbin coupling body which is formed by coupling two or more bobbin bodies.

Note that the number of the bobbin body may be appropriately changed according to the use, configuration, and the like of the solenoid.

As a main characteristic of the present invention, the connector part incorporating a prescribed number of terminal metal fitting(s), preferably female connecting terminal(s), which is (are) electrically connected to external terminal(s) provided with various apparatus, is provided on one end part of the bobbin, which is installed inside a central portion of the yoke.

The configuration of such connector part is not particularly limited as long as the terminal metal fitting is electrically connected to the external terminal, which is provided with various apparatus.

By such a configuration, the solenoid is small since a relatively large space is not required for disposing lead wire(s) as in the prior art, so that the solenoid can be inexpensively produced.

The connector part 6, which incorporates a prescribed number of terminal metal fitting(s), can be provided on one end part of the bobbin 3.

The connector part 6 is preferably provided on one axial end part (upper end or lower end) of the bobbin 3.

Such a configuration allows the size of the solenoid to be reduced further.

In FIG. 5, the connector part 6 is provided on the upper end of the bobbin 3, and is divided to two parts in a vertical direction to house various members or the like. In this example, the connector part 6 is configured by a case body 6$a$ opened in back-side end portions of both side faces and back side face and upper portion, a prescribed number of terminal metal fitting(s) 7 provided on the case body 6$a$, and a case cover 6$b$ which closes an opening portion of the case body 6$a$ while pressing the terminal metal fitting(s) 7 from the above to fix the terminal metal fitting(s) 7.

Note that in FIGS. 4 and 5, the case body 6$a$ configuring the connector part 6 is configured to be integrally formed with the flange portion of the other end side (upper end side in FIGS. 4 and 5) of the bobbin 3; however, the case body 6$a$ and the flange portion may not necessarily be integrally formed, and they may be separately formed respectively.

As illustrated in FIG. 5, in the Examples, the case body 6$a$ is configured by a bottom face 61$a$, a front wall 62$a$ formed to erect from a front end edge of the bottom face 61$a$, a stepped portion 63$a$ having a required height which is formed from a center portion of the bottom face 61$a$ to the front wall 62$a$, and a pair of sidewalls 64$a$ and 64$a$ erected on both end edges of the stepped portion 63$a$.

In FIG. 5, holding groove portions 65$a$ and 65$a$, which are formed by notching in a required depth so as to match with each shape of the terminal metal fittings 71 and 72, are provided in right and left end portions of the stepped portion 63$a$.

Furthermore, in FIG. 5, engaging projections 66$a$ and 66$a$, which engage with engaging portions 71$b$ and 72$b$ formed on the front edge sides of the terminal metal fittings 71 and 72, are integrally provided attaching inside the front end sides of the holding groove portions 65$a$ and 65$a$.

Note that in FIGS. 1 to 5, terminal insertion ports 6$f$ and 6$f$ opened in the side, which have a rectangular shape in plane view, are formed to penetrate through right and left end portions of the front wall 62$a$ of the case body 6$a$.

In case that the terminal metal fittings 71 and 72 are respectively configured by a female terminal, the lateral side opening portions 6$f$ and 6$f$ are used in inserting male terminals, which are provided with various apparatus as external terminals 101 and 101, into the terminal metal fittings 71 and 72 when the male terminals are electrically contacted with the terminal metal fittings 71 and 72.

Furthermore, as illustrated in FIG. 5, winding guide portions 67$a$ and 67$b$, which guide a winding to the terminal metal fittings 71 and 72, are formed by notching the back side of the case body 6$a$ from the outer circumferential side thereof in a prescribed depth.

Both of the terminal metal fittings 71 and 72 are formed from a material having conductivity, and are configured to have the one end connected electrically to a winding and the other end connected electrically by contacting with contact portions of external terminals (not illustrated) provided with the external connector of the opposite party (various apparatus).

Note that in the Examples, the terminal metal fittings 71 and 72 are formed from a material having spring properties as well as conductivity; however, the configuration of terminal metal fitting is not particularly limited as long as the terminal metal fitting is formed from at least a material having conductivity so as to connect electrically to the external terminal of the external connector as a terminal.

An embodiment of the terminal metal fitting may be selected according to an embodiment of the external terminal provided with the apparatus to be attached. The terminal metal fitting is preferably selected from a female terminal.

By such a configuration, a relatively large space is not required for disposing a male terminal, and additionally when attaching the solenoid to the apparatus, the solenoid can be easily incorporated in the apparatus by inserting male terminal(s), which is (are) provided as a terminal to an external connector (external power source) provided with the apparatus, into the female terminal(s). Thus, since it is not required to connect the solenoid and the apparatus through a connector part or lead wire(s), the assembly efficiency can be largely improved.

As illustrated in FIG. 6, in the Examples, the terminal metal fittings 71 and 72 configure female terminals which are formed symmetrical with each other, and both of them are formed by bending the punching member, which is formed by punching a plate-like body into a prescribed shape, in the plate thickness direction. The terminal metal fittings 71 and 72 are configured by terminal bodies 71*a* and 72*a* held in the holding groove portions 65*a* and 65*a* of the case body 6*a*, engaging portions 71*b* and 72*b* formed on front end portions in a longitudinal direction of the terminal bodies 71*a* and 72*a*, elastic contact portions 71*c* and 72*c* formed on tip portions of the engaging portions 71*b* and 72*b*, and winding connecting portions 71*d* and 72*d* formed on rear edge sides in a longitudinal direction of the terminal bodies 71*a* and 72*a*.

The engaging portions 71*b* and 72*b* are formed by bending the front end portions in a longitudinal direction of the terminal bodies 71*a* and 72*a*, and are formed in a U-shaped opening outwardly. The engaging portions 71*b* and 72*b* engage with the engaging projections 66*a* and 66*a* of the case body 6*a*.

The elastic contact portions 71*c* and 72*c* are formed by bending the tip portions of the engaging portions 71*b* and 72*b* vertically backward to make them parallel to the terminal bodies 71*a* and 72*a*, and contact with external terminals of the external connector.

Thus, the elastic contact portions 71*c* and 72*c* are elastically displaceable in the plate thickness direction, and can contact elastically with the external terminals (male terminals) inserted from the terminal insertion ports 6*f* and 6*f*.

The winding connecting portions 71*d* and 72*d* are formed protruding upward from the rear edge sides in a longitudinal direction of the terminal bodies 71*a* and 72*a* to connect electrically to a winding.

Furthermore, winding guide portions 71*e* and 72*e* are formed by folding back the extension pieces, which are protruded from the rear end edge of the terminal bodies 71*a* and 72*a*, to guide a winding.

As described above, in FIG. 5, the holding groove portions 65*a* and 65*a*, into which the terminal metal fittings 71 and 72 are pressed, are provided in right and left end portions of the stepped portion 63*a* of the case body 6*a*. The holding groove portions 65*a* and 65*a* are formed by notching in a prescribed depth so as to match with each shape of the terminal metal fittings 71 and 72. The engaging projections 66*a* and 66*a*, which engage with engaging portions 71*b* and 72*b*, are formed protruding upward in the holding groove portions 65*a* and 65*a*.

Thus, the terminal metal fittings 71 and 72 are held in the case body 6*a* by pressing the terminal bodies 71*a* and 72*a* into the holding groove portions 65*a* and 65*a* in a state where the engaging portions 71*b* and 72*b* engage with the engaging projections 66*a* and 66*a*.

Note that in the Examples, the terminal metal fittings 71 and 72 are attached to the case body 6*a* by pressing the terminal metal fittings 71 and 72 into the holding groove portions 65*a* and 65*a* which are formed on the stepped portion 63*a* of the case body 6*a*; however, the terminal metal fittings 71 and 72 can be attached to the case body 6*a* by using a known method such as a method of burying the terminal metal fitting into the case body through integral molding.

Furthermore, in the Examples, the number of the terminal metal fitting is two. However, the number of the terminal metal fitting may be appropriately changed according to the number of a winding, which forms an electromagnetic coil, or the like.

In FIG. 5, a through hole 6*d* is formed in a vertical direction on a center portion of the case body 6*a*.

In addition, a through hole 6*e* is formed on a center portion of the case cover 6*b* so as to correspond to the through hole 6*d*, which formed on a center portion of the case body 6*a*. As illustrated in FIG. 3, when the case body 6*a* is coupled with the case cover 6*b*, through holes, which are communicated with each other, are formed in a vertical direction, and the iron core 5 can be disposed inside the through holes.

Such bobbin having the connector part configures a coil device, for example, by connecting one end (winding-start end portion) of a winding electrically to one terminal metal fitting 71, and further drawing the winding, which is led out from the winding-start end portion of the winding, in the winding guide portion 67*a*, and then drawing it in the winding guide portion 67*b* after winding it around an outer peripheral portion of the barrel part 3*a* in a prescribed winding direction to form an electromagnetic coil 4, and connecting the other end (winding-finish end portion) of the winding electrically to the other terminal metal fitting 72.

As illustrated in FIG. 7, in the coil device having such configuration, the elastic contact portions 71*c* and 72*c* are elastically contacted with external terminals (male terminals) 101 and 101 of an external connector provided with various apparatus, which are inserted from the terminal insertion ports 6*f* and 6*f*, to electrically connect to each other.

The iron core 5 is formed from iron or the like, and has a cylindrical shape, and is disposed in the bobbin 3.

The specific configuration of the iron core 5 is particularly limited. A known configuration can be selected according to a specific configuration, form, and the like of the applied solenoid.

For example, the iron core 5 may be configured by a fixed iron core only, a movable iron core only, or a combination of a fixed iron core and a movable iron core.

In FIGS. 1 to 3, the iron core 5 is configured by a columnar plunger (movable iron core) 5*a* mounted inside the bobbin 3 to be able to oscillate freely, and a stopper (fixed iron core) 5*b* disposed on a lower portion of the plunger 5*a* for preventing the plunger 5*a* from deviating from the inside of the yoke 2. An upper end of the plunger 5*a* is formed protruding at a required length from an upper face of the yoke lid 8.

Specifically, as illustrated in FIGS. 2 and 3, a fitting protrusion 5*c*, which is fitted to a fitting portion 2*d* formed on a center portion of the base portion 2*a* of the yoke 2, is formed on a lower end portion of the stopper 5*b*. Thus, the fitting protrusion 5*c* is fitted to the fitting portion 2*d*, so that the stopper 5*b* is fixed to the base portion 2*a* of the yoke 2.

Furthermore, as illustrated in FIGS. 2 and 3, while an upper end portion of the stopper 5*b* is formed in the shape of a truncated cone, and a recess facing the upper end portion of the stopper 5*b* is formed on a lower end of the plunger 5*a* disposed on a upper portion of the stopper 5*b* by notching toward the interior thereof in axial direction in a required depth, and they are fitted to each other.

Such a configuration allows the plunger 5*a* to be oscillated freely inside the bobbin 3 in the axial direction by a magnetic field generated by the energization of the electromagnetic coil 4.

Note that in FIGS. 1 to 3, the solenoid is configured so that the plunger 5*a* is coupled with various apparatus or device such as copying machine through an attaching member 10; however, the solenoid may be configured so that the apparatus or device conducts prescribed operation(s) by coupling the plunger 5*a* with a prescribed member of the apparatus or device.

Thus, the attaching member 10 is not always required.

Furthermore, in FIGS. 1 to 3, the columnar pipe 9, which has an outer diameter approximately equal to the inner diameter of the barrel part of the bobbin 3, is provided inside the bobbin 3, and the iron core 5, which has an outer diameter approximately equal to the inner diameter of the pipe 9, is arranged inside the pipe 9.

The pipe 9 produces an effect for making the oscillation of the plunger 5*a* smooth by guiding the sliding of the plunger 5*a*, which configures the iron core 5, inside the pipe 9, and additionally an effect for solving a problem that the plunger 5*a* is hardly oscillated by contraction of the bobbin 3 in the use under a high temperature environment.

Note that the pipe 9 is configured so that the axial length thereof is approximately equal to the length from the upper face of the yoke lid 8 to the bottom face of the yoke 2 (upper face of the base portion 2*a*), and the flat plate-shaped flange portion 3*b*, which is formed protruding outward in a radical direction from one axial end of the pipe 9, is locked in the upper face of the yoke lid 8.

According to the solenoid 1 having such a configuration, since the plunger 5*a* is oscillated freely inside the bobbin 3 in the axial direction by a magnetic field generated from the electromagnetic coil 4 by energization between the solenoid 1 and an external connector (external power source) provided with various apparatus. Thus, various apparatus, which is coupled with the plunger 5*a* through the attaching member 10 attached to the upper end of the plunger 5*a*, also conducts prescribed operation(s) accompanied by the oscillation of the plunger 5*a*.

In the present invention, the configuration of solenoid is not limited to the above descriptions. Therefore, the present invention includes a solenoid configured by a plurality of solenoids, such as a U-type solenoid, more concretely, a solenoid in which a plurality of solenoids containing a yoke, a bobbin having an electromagnetic coil disposed inside the yoke, and an iron core disposed inside the bobbin as the unit are coupled.

The solenoid 11 illustrated in FIG. 8 illustrates a modified example of the solenoid 1 illustrated in FIG. 1.

The solenoid 11 has the approximately same configuration as the solenoid 1, and configures what is called a flapper-type solenoid. The solenoid 11 differs from the solenoid 1 in that, the iron core 15 is only configured by a columnar fixed iron core having a prescribed length, the connector part 16 incorporating a prescribed number of terminal metal fittings (not illustrated) is provided on a lower end of the bobbin 13, and instead of the yoke lid, the flapper (movable plate) 18 is attached to the upper portion of the yoke 12 to be able to swing freely.

As illustrated in FIG. 8, the yoke 12 is formed as a body having a U-shaped cross section, which is formed by a base portion 12*a* configuring a bottom face of the yoke 12 and a pair of raised portions 12*b* and 12*b* provided at both ends of the base portion 12*a* to be parallel to each other. The flapper 18 is attached to the upper face of one of the opposing raised portion 12*b* to be able to swing freely.

Note that in FIG. 8, the reference sign 18*a* denotes an engaging piece formed by folding a tip end portion of the flapper 18 upward in order to engage the yoke 2 with a cam (not illustrated) of another apparatus or device, and the reference sign 20 denotes an attaching member configured to attach the yoke 12 to a prescribed apparatus or device such as a copying machine.

At a center portion of the outer face of one of the raised portion 12*b* of the yoke 12, a protrusion 12*g* is provided protruding slightly downwardly, and one end of a spring member S that constantly energizes the flapper 18 in a direction causing the flapper 18 to move away from the yoke 12 is engaged with the protrusion 12*g*.

Meanwhile, as illustrated in FIG. 8, a protruding portion 18*b*, which is L-shaped in a side view and with which the other end of the spring member S is engaged, is integrally provided attaching to a base end portion of the flapper 18.

The connector part 16 is integrally provided on the lower end of the bobbin 13, and has the same configuration as the connector part 6, and is configured so that the terminal metal fittings incorporated in the connector part 16 are contacted with the external terminals (male terminals) inserted from terminal insertion ports 16*f* and 16*f* opened in the side, which are formed to penetrate through the front wall of the connector part 16.

In FIG. 8, the iron core 15 is configured by a columnar fixed iron core, and the upper face of the iron core 15 is configured to be flush with each end face of raised portions 12*b* and 12*b* in a state where the iron core 15 is attached to the yoke 12.

Furthermore, the iron core 15 is deposed inside the bobbin 13 in a state where the lower end of the iron core 15 is fixed to the base portion 12*a* of the yoke 12.

In the solenoid 11 having such a configuration, the flapper 18 moves away from the yoke 12 by energizing force of the spring member S in a state where an energization is not conducted, and since a magnetic field is generated when the electromagnetic coil 14 is energized, the flapper 18, which is deposed to be able to swing freely on the upper portion of the iron core 15, is sucked to the iron core 15.

The solenoid 21 illustrated in FIG. 9 illustrates a modified example of the solenoid 1 illustrated in FIG. 1.

The solenoid 21 has the approximately same configuration as the solenoid 1. As illustrated in FIG. 10, the solenoid 21 differs from the solenoid 1 in that a bobbin coupling body 23, which is formed by axially coupling each end portion of two bobbins having the same configuration as the bobbin 3 (first bobbin 231 and second bobbin 232) through a connecting part 233, is used for a bobbin, and the iron core is configured by a pair of stoppers 25*b* and 25*c* and a plunger 25*a*, which is disposed to be able to oscillate freely between the stoppers 25*b* and 25*c*.

The bobbin 23 is configured by a first bobbin 231, a second bobbin 232 disposed in series (in alignment in an axial direction) to the first bobbin 231, and a connecting part 233 coupling the first bobbin 231 and the second bobbin 232 in an axial direction (in series). As illustrated in FIG. 11, the bobbin 23 configures a coil device by winding windings around bobbin 231 and 232 respectively to form electromagnetic coils 24*a* and 24*b*.

Note that in the Examples, the connecting part 233 is configured by a plate-shaped body having a required size; however, the configuration of connecting part is not particularly limited as long as one end portion of the first bobbin 231 can be coupled with one portion of the second bobbin 232 in series.

Ribs 233*a*, 233*b* and 233*c*, which protrude outward in a radical direction and extend in an axis direction, are formed by forming guide grooves 233*d* and 233*e* having a required depth on center portion and both end portions in an outer face in a radical direction of the connecting part 233 at prescribed spaces.

The guide grooves 233*d* and 233*e* configure a winding guide portion for guiding one end (winding-start side) and the other end (winding-finish side) of a winding, which is wound around an outer peripheral portion of the barrel part of the bobbin disposed in a position apart from the connector part 26 (the first bobbin 231 in FIG. 11), to prescribed terminal metal fittings, respectively.

The connector part 26 has the approximately same configuration as that of the solenoid 1. As illustrated in FIG. 11, the connector part 26 is integrally formed on the upper end of the coupling body 23, and is divided to two parts in a vertical direction to house various members or the like. The connector part 26 is configured by a case body 26*a* opened in back-side end portions of both side faces and back side face and upper portion, a prescribed number of terminal metal fitting(s) 27 provided on the case body 26*a*, and a case cover (not illustrated) which closes an opening portion of the case body 26*a* while pressing the terminal metal fitting(s) 27 from the above to fix the terminal metal fitting(s) 27.

In FIG. 11, the terminal metal fitting 27 is configured by three terminal metal fittings which are disposed at prescribed spaces. The terminal metal fitting 27 is configured by a pair of connecting terminals which are provided on both ends of the case body 26*a* and are configured by a female terminal, and a relay terminal 73 which is provided on a center of the case body 26*a*, and their terminals are formed from a material having conductivity.

Among the terminal metal fittings, one end of a winding forming a first electromagnetic coil 24*a* is electrically connected to a first connecting terminal 71, the other end of a winding forming a second electromagnetic coil 24*b* is electrically connected to a second connecting terminal 72, and the other end of the winding forming the first electromagnetic coil 24*a* and one end of the winding forming the second electromagnetic coil 24*b* are electrically connected to the central relay terminal 73, respectively.

The iron core 25 is configured by a plunger 25*a* mounted inside the bobbin coupling body 23 to be able to oscillate freely, and a pair of stoppers 25*b* and 25*c* which are disposed on both end of the plunger 25*a* for preventing the plunger 25*a* from deviating from the inside of the yoke 22.

As illustrated in FIG. 10, a fitting protrusion 25*d*, which is formed protruding from an upper end portion of the stopper 25*b*, and a fitting portion 28*d*, which is formed on a center portion of the yoke lid 28, are fitted to each other, thereby fixing the stopper 25*b* to a lower face of the yoke lid 28. A fitting protrusion 25*d*, which is formed protruding from a lower end portion of the stopper 25*c*, and a fitting portion 22*d*, which is formed on a center portion of the base portion 22*a* of the yoke 22, are fitted to each other, thereby fixing the stopper 25*c* to the base portion 22*a* of the yoke 22.

While both of the upper end portion of the stopper 25*c* and the lower end portion of the stopper 25*b* are formed in the shape of a truncated cone, and a recess, which faces the lower end portion of the stopper 25*b* and the upper end portion of the stopper 25*c* respectively, is formed on both ends of the plunger 25*a* disposed between the stoppers 25*b* and 25*c* by notching toward the interior thereof in axial direction in a required depth, and they are fitted to each other.

Note that the stopper 25*b* is made longer by an axial length of the connector part 26 than the stopper 25*c*.

In this example, the columnar pipe 29, which has an outer diameter approximately equal to the inner diameter of the barrel part of the bobbin coupling body 23, is provided inside the bobbin coupling body 23, and the plunger 25*a*, which has an outer diameter approximately equal to the inner diameter of the pipe 29, is arranged inside the pipe 29.

The pipe 29 is configured so that the axial length thereof is approximately equal to the length from the upper face of the yoke lid 28 to the bottom face of the yoke 22 (upper face of the base portion 22*a*). A flat plate-shaped flange portion, which is formed protruding outward in a radical direction from one axial end of the pipe 29, is locked in the lower face of the bobbin coupling body 23.

Note that, as illustrated in FIG. 11, a pair of magnets 30 and 30 is arranged oppositely between the bobbins 231 and 232 so that the plunger 25*a* is kept stationary at a center portion of the bobbin coupling body 233 in a state where an energization is not conducted.

In the solenoid 21 having such a configuration, in a state where an energization is not conducted, by a pair of magnets 30 and 30 provided at an axial center portion of the bobbin coupling body 23, the plunger 25*a* is disposed in the vicinity of the center portion in a stationary state, and when one electromagnetic coil of electromagnetic coils 24*a* and 24*b*, which are wound around the bobbin coupling body 23, is energized, the plunger 25*a* is oscillated freely in the direction of the electromagnetic coil, which is energized.

The plunger 25*a* is coupled with a prescribed member of various apparatus or device through a guide bar G for an attaching member. Therefore, the guide bar G is also oscillated freely in the axial direction accompanied by the oscillation of the plunger 5*a*, and as a result, this apparatus or device conducts prescribed operation(s).

In attaching the solenoid of the present invention to various apparatus, for example, as illustrated in FIG. 12, while external terminals (male terminals) 100*b* and 100*b* provided with the external connector are inserted from insertion ports, which are formed in the vicinity of the terminal metal fittings (female terminals) incorporated in the connector part of the solenoid 1, the external terminals are pushed into a lower side from the upper side along a pair of locking pieces 100*b* and 100*b* having snap fit structure, which are oppositely erected at prescribed spaces so as to support the right and left sides of the solenoid 1, while positioning the external terminals by the locking pieces. Whereby, while each locking pieces 100*b* and 100*b* are elastically deformed outwardly, the locking pieces are elastically returned to an original position to lock the right and left side edges of the solenoid 1 respectively at the point where the right and left side edges of the solenoid 1 are engaged with each locking claws 100*c* and 100*c*, and each fixing pieces 100*d* and 100*d* support the upper and lower side edges of the solenoid 1, thereby allowing the solenoid 1 to attach to an attaching portion 100*a*, which is disposed on a prescribed position of the apparatus 100, in a single operation.

Thus, the solenoid of the present invention can be easily attached to various apparatus by simply fitting into a prescribed position of the apparatus.

INDUSTRIAL APPLICABILITY

In the solenoid according to the present invention, since a connector part incorporating a prescribed number of terminal metal fitting(s), in particular, female terminal(s) is provided on one end part of a bobbin having an electromagnetic coil, which is disposed inside a yoke, the solenoid is inexpensive and small, and can be easily attached to various apparatus. Thus, the solenoid can be used in a wide range of fields.

REFERENCE SIGNS LIST

1, 11, 21 Solenoid
2, 12, 22 Yoke
2*a*, 12*a*, 22*a* Base portion
2*b*, 12*b*, 22*b* Raised portion
2*c*, 12*c*, 22*c* Opening portion
2*d*, 12*d*, 22*d*, 28*a* Fitting portion
2*e*, 22*e* Engaging portion
3, 13 Bobbin
3*a* Barrel part
3*b* Flange portion
23 Bobbin coupling body
231 First bobbin
232 Second bobbin
233 Connecting part
233*a*, 233*b*, 233*c* Rib
233*d*, 233*e* Winding guide groove
4, 14 Electromagnetic coil
24*a* First electromagnetic coil
24*b* Second electromagnetic coil
5, 25 Iron core
5*a*, 25*a* Plunger
5*b*, 25*b*, 25*c* Stopper
5*c*, 25*d* Fitting protrusion
15 Iron core (Fixed iron core)
6, 16, 26 Connector part
6*a*, 26*a* Case body
6*b* Case cover
61*a* Bottom face
62*a* Front wall
63*a* Stepped portion
64*a* Sidewall
65*a* Holding groove portion
66*a* Engaging projection
67*a*, 67*b* Winding guide portion
6*d*, 16*d*, 26*d* Through hole
6*e*, 16*e*, 26*e* Through hole
6*f*, 16*f*, 26*f* Terminal insertion port
268*a*, 168*b*, 268*c* Winding guide portion
7 Terminal metal fitting
71, 72 Terminal metal fitting (Connecting terminal)
71*a*, 72*a* Terminal body
71*b*, 72*b* Engaging portion
71*c*, 72*c* Elastic contact portion
71*d*, 72*d* Winding connecting portion
73 Relay terminal
8, 28 Yoke lid
8*a* Passing hole
8*b*, 28*b* Engaging portion
18 Flapper
18*a* Engaging piece
18*b* Protruding portion
9, 29 Pipe
10, 20 Attaching member
30 Magnet
100 Apparatus
100*a* Attaching portion
100*b* Locking piece
100*c* Locking claw
100*d* Fixing piece
101 External terminal (Male terminal)
S Spring member
G Guide bar
X Winding direction

The invention claimed is:

1. A solenoid comprising a yoke, a bobbin having an electromagnetic coil disposed inside the yoke, and an iron core disposed inside the bobbin, wherein a connector part incorporating a prescribed number of terminal metal fittings is provided on one end part of the bobbin, and among the terminal metal fittings, the terminal, which is connected electrically to an external terminal provided with an apparatus having the solenoid, is configured by a female terminal, wherein the female terminal comprises a terminal body, an engaging portion formed on front end portion in a longitudinal direction of the terminal body, an elastic contact portion formed on tip portion of the engaging portion, and a winding connecting portion formed on rear edge side in a longitudinal direction of the terminal body.

2. The solenoid according to claim 1, wherein the female terminal further comprises a holding groove portion holding the terminal body and an engaging projection for engaging with the engaging portion are formed inside the connector part.

3. The solenoid according to claim 2, wherein the connector part is provided on one axial end portion of the bobbin.

4. The solenoid according to claim 2, wherein the yoke, which formed as a body having a U-shaped cross section, has a yoke lid for closing the upper opening portion of the yoke, the connector part is provided above the bobbin, and the iron core is configured by a fixed iron core having the lower end fixed to the bottom face of the yoke, and a movable iron core disposed above the fixed iron core to be able to oscillate freely.

5. The solenoid according to claim 1, wherein the connector part is provided on one axial end portion of the bobbin.

6. The solenoid according to claim 5, wherein the yoke, which formed as a body having a U-shaped cross section, has a yoke lid for closing the upper opening portion of the yoke, the connector part is provided above the bobbin, and the iron core is configured by a fixed iron core having the lower end fixed to the bottom face of the yoke, and a movable iron core disposed above the fixed iron core to be able to oscillate freely.

7. The solenoid according to claim 1, wherein the yoke, which formed as a body having a U-shaped cross section, has a yoke lid for closing the upper opening portion of the yoke, the connector part is provided above the bobbin, and the iron core is configured by a fixed iron core having the lower end fixed to the bottom face of the yoke, and a movable iron core disposed above the fixed iron core to be able to oscillate freely.

8. The solenoid according to claim 1, wherein the yoke, which formed as a body having a U-shaped cross section, has a yoke lid for closing the upper opening portion of the yoke, the bobbin is configured as a coupling body in which two bobbins are axially coupled to each other, the iron core is configured by a first fixed iron core having the upper end fixed to the lower face of the yoke lid, a second fixed iron core having the lower end fixed to the bottom face of the yoke, and a movable iron core disposed to be able to oscillate freely between the first fixed iron core and the second fixed iron core, the connector part incorporates three terminal metal fittings disposed at prescribed spaces, and among the electromagnetic coils, one end of a winding forming a first electromagnetic coil is electrically connected to a first terminal metal fitting, the other end of the winding forming the first electromagnetic coil and one end of a winding forming a second electromagnetic coil are electrically connected to a second terminal metal fitting, and the other end of the winding forming the second electromagnetic coil is electrically connected to a third terminal metal fitting, respectively.

9. The solenoid according to claim 8, wherein both of the first and third terminal metal fittings are configured by a female terminal, and the coupling body has a pair of magnets arranged oppositely between the bobbins.

10. The solenoid according to claim 1, wherein the yoke has a flapper attached above the yoke to be able to swing freely, the iron core is configured by a fixed iron core having the lower end fixed to the bottom face of the yoke, and each end face of raised portions of the yoke is configured to be flush with the upper face of the iron core in a state where the iron core is attached.

11. The solenoid according to claim 10, wherein the connector part is provided below the bobbin, and the flapper is supported by a vertical flange formed on one raised portion, and is configured to be able to swing freely by attaching a spring member between the yoke and the flapper.

12. The solenoid according to claim 11, wherein the connector part is integrally provided on the lower end of the bobbin.

* * * * *